(12) United States Patent
Dickie

(10) Patent No.: US 8,924,523 B1
(45) Date of Patent: Dec. 30, 2014

(54) SYSTEM AND METHOD FOR SHARING UPDATED INFORMATION WITH KNOWN USERS

(71) Applicant: Gimigo Inc., Seattle, WA (US)

(72) Inventor: Lukas J. Dickie, Seattle, WA (US)

(73) Assignee: Gimigo Inc., Seattle, WA (US)

( * ) Notice: Subject to any disclaimer, the term of this patent is extended or adjusted under 35 U.S.C. 154(b) by 0 days.

(21) Appl. No.: 14/214,851

(22) Filed: Mar. 15, 2014

Related U.S. Application Data

(60) Provisional application No. 61/800,210, filed on Mar. 15, 2013.

(51) Int. Cl.
*G06F 15/177* (2006.01)
*H04L 29/06* (2006.01)
*H04L 29/12* (2006.01)
*G06Q 30/02* (2012.01)
*G06Q 20/34* (2012.01)

(52) U.S. Cl.
CPC .......... *H04L 65/403* (2013.01); *H04L 61/1594* (2013.01); *H04L 61/1576* (2013.01); *H04L 29/12198* (2013.01); *G06Q 30/0271* (2013.01); *G06Q 20/3552* (2013.01); *G06Q 20/3558* (2013.01)
USPC .......... 709/221; 709/220; 705/14.66

(58) Field of Classification Search
CPC .......... G06Q 30/0271; G06Q 20/3552; G06Q 20/3558; H04L 61/1576; H04L 61/1594; H04L 29/12198
USPC .......... 709/204, 206, 217, 221, 220; 705/14.53, 318, 325, 14.66; 455/411, 455/412.1; 726/18; 715/739
See application file for complete search history.

(56) References Cited

U.S. PATENT DOCUMENTS

| | | | |
|---|---|---|---|
| 2013/0047089 A1* | 2/2013 | Kulathungam | 715/739 |
| 2013/0072162 A1* | 3/2013 | Celik | 455/412.1 |
| 2013/0086201 A1* | 4/2013 | Legge | 709/217 |
| 2013/0104251 A1* | 4/2013 | Moore et al. | 726/30 |
| 2013/0133062 A1* | 5/2013 | Boss et al. | 726/18 |
| 2013/0166661 A1* | 6/2013 | Robertson et al. | 709/206 |
| 2013/0217365 A1* | 8/2013 | Ramnani | 455/414.1 |
| 2013/0252585 A1* | 9/2013 | Moshir et al. | 455/411 |
| 2013/0268357 A1* | 10/2013 | Heath | 705/14.53 |
| 2013/0275513 A1* | 10/2013 | Borovyk et al. | 709/204 |

* cited by examiner

*Primary Examiner* — Le H Luu
(74) *Attorney, Agent, or Firm* — Joe Zheng

(57) ABSTRACT

Techniques for distributing updated personal information are described. The update is retrieved from a device where it was created and downloaded to another device under the control of a server operating a personal information management system. The update is fully controlled by the user to be released to only certain users or a group of users. Further the user is able to control which portion of the personal information may be shared.

19 Claims, 13 Drawing Sheets

US 8,924,523 B1

SYSTEM AND METHOD FOR SHARING UPDATED INFORMATION WITH KNOWN USERS

TECHNICAL FIELD

The invention is generally related to the area of management of distributed information. In particular, the invention is related management and distribution of personal information over a network.

BACKGROUND

In many occasions, we as individuals provide personal information to other individuals, such as family and friends, or to any other entities, such as businesses and organizations. Consequently, our personal information may end up being stored electronically in many different places, such as in computers, mobile phones, and tablet devices; and in databases, such as those of financial institutions, healthcare providers, government agencies, and the like.

Our personal information can include non-sensitive information, but not limited to, phone numbers and email addresses, as well as sensitive information, but not limited to, social security numbers, credit card numbers, and bank account numbers. If some of the personal information changes, it is typically up to the individual to inform everyone of the change, which is a manual process (via phone, email, text message, website, etc). This notification process takes time and effort on the part of the individual. Additionally, the individual may not remember everyone that has his/her information, so some individuals or other entities are not notified of the change. Further, there is no guarantee that the recipients of the new information will update their electronic records for this individual. As a result, there is a high potential for human error in this manual notification process.

With respect to the impact on business, over 40 million people in the United States move each year. On average, people will change jobs 11 times in their lifetime. Businesses experience significant budgetary waste around inaccurate personal information data. For example, recent surveys revealed that nearly two out of three businesses find that between five and thirty percent of their marketing budget is wasted annually as a result of outdated data. Further, the loss of customers due to inaccurate contact data can be very costly. For example, acquiring a new customer can cost 6 to 7 times more than retaining an existing customer. Therefore, with respect to managing personal information, new approaches are needed for keeping personal information current when it changes.

SUMMARY

This section summarizes some aspects of the present disclosure and briefly introduces some preferred embodiments. Simplifications or omissions in this section as well as in the abstract or the title of this description may be made to avoid obscuring the purpose of this section, the abstract and the title. Such simplifications or omissions are not intended to limit the scope of the present disclosure nor imply any limitations.

Generally speaking, this invention describes techniques for managing and distributing personal information, more particularly managing and distributing updates to the personal information. According to one aspect of the present invention, a user determines what to release and who can see what. In order words, the user is able to control the update and determine what entities to receive the update.

According to another aspect of the present invention, depending on where a user has updated his/her personal information, the update may reside in a local or first computing device and/or a server, where the first computing device (e.g., a smart phone) is the one that the user has used to update the personal information.

According to still another aspect of the present invention, a management module is configured to manage the update and facilitate the uploading or sharing of the update to a second computing device when a notification of the update is received and activated from the second computing device. Depending on implementation, the second computing device may be associated with a contact of the user or a business entity. Under the control of the user, the contact or the business entity receives a controlled update from the user to serve the purpose of, for example, staying in touch with the contact and receiving promotion information from the business entity.

According to yet another aspect of the present invention, one or more links in a notification remains unchanged regardless of how many times the user has updated the personal information.

The present invention may be implemented as a method, an apparatus of a part of a device, a service or a software module to be executed in a designated device. According to one embodiment, the present invention is a method for distributing updated data over a network, the method comprises: establishing a communication session between a first computing device associated with a first user and a second computing device associated with a second user; notifying the second user with a notification when the first user has updated personal information, wherein the notification includes at least one link that remains unchanged regardless how many times the first user has updated personal information; and facilitating the second computing device to receive the updated personal information of the first user over the network, wherein the updated personal information is distributed on at least one computing device. Depending on actual use, some or all of the updated personal information can be located on the first computing device and/or on a server operating a personal information management system.

According to still another embodiment, the present invention is a method for distributing updated data over a network, the method comprises: receiving in a first computing device associated with a first user a notification that personal information of a second user in a relationship with the first user has been updated, wherein the notification includes a link to indicate where the updated personal information resides; establishing a session between the first computing device and a second computing device on which the second user has updated the personal information; and retrieving, in accordance with the link in the notification, the updated personal information from the second computing device.

According to still another embodiment, the present invention a software product loaded in a computer readable media and executed in a server computer to cause the server computer to perform operations of: creating a link between a first user and a second user when the first user initiates a relationship with a second user by sharing a portion or all of personal information of the first user with the second user, wherein the first user is a registered user of a personal information management system, the link is updated when the second user changes from a non-registered user to a registered user; allowing the second user to view the portion or all of personal information of the first user in a way depending on whether the second user is a non-registered user or a registered user; sending out a notification to the second user when the first user has updated the personal information, wherein the notification includes one or more links to data pertaining to the updated personal information, the data resides in a first computing device being used by the first user to update the personal information; and facilitating to retrieve from the first computing device the updated personal information.

According to yet another embodiment, the present invention is a software product loaded in a computer readable media and executed in a portable computing device to cause the portable computing device to perform operations of: providing a graphic interface to allow a first user to create personal information thereof and update the personal information on the portable computing device; uploading the personal information to a server computer configured to operate a personal management information system; caching the updated personal information locally in the portable computing device; releasing the updated personal information from the portable computing device to a second computing device being used by a second user when the server computer authorizes a request from the second computing device, wherein the request is routed to the portable computing device via the server, and the server is configured to update a notification originally created to notify the second user of the updated personal information, and wherein the server is configured to: create a link between the first user and the second user when the first user initiates a relationship with the second user by sharing a portion or all of the personal information of the first user with the second user, the first user is a registered user of the personal information management system, the link is updated when the second user changes from a non-registered user to a registered user; allow the second user to view the portion or all of personal information of the first user in a way depending on whether the second user is a non-registered user or a registered user; and send out the notification to the second user when the first user has updated the personal information, wherein the notification includes one or more links to data pertaining to the updated personal information.

One of the objects, advantages and benefits of the present invention is to enable users to keep their contacts updated or businesses to maintain the updated information about their customers.

Other objects, advantages and benefits of the present disclosure will become more apparent from the following detailed description of preferred embodiment when taken in conjunction with the accompanying drawings.

BRIEF DESCRIPTION OF THE DRAWINGS

Various inventive embodiments disclosed herein, both as to its organization and manner of operation, together with further objectives and advantages, may be best understood by reference to the following description, taken in connection with the accompanying drawings as set forth below.

DETAILED DESCRIPTION

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or diagrams representing one or more embodiments of the invention do not inherently indicate any particular order nor imply any limitations in the invention.

A personal information management system for and methods of managing and distributing personal information over a network are disclosed. One of the objectives, advantages and benefits in the present invention is that the personal information can be updated in one place and then the updated information is automatically distributed to other users. Further, the personal information management system includes mechanisms by which users can manage what portion or portions of their personal information is shared with other users, wherein the personal information shared with one recipient can be different from the personal information shared with another recipient. The personal information management system disclosed herein is configured to automatically manage and/or distribute updated personal information to any entities with which a user has a relationship. Unless specifically stated otherwise, whenever an application or a module is described herein to be configured to perform one or more tasks or achieve one or more objectives in the present invention, it means the application or a module is designed, implemented, constructed, and architected for such. Further, the connection between one user and another persists indefinitely over time so that updated personal information can be distributed without the user having to remember every entity with which he/she has a relationship over a period of time.

Figure 1A:
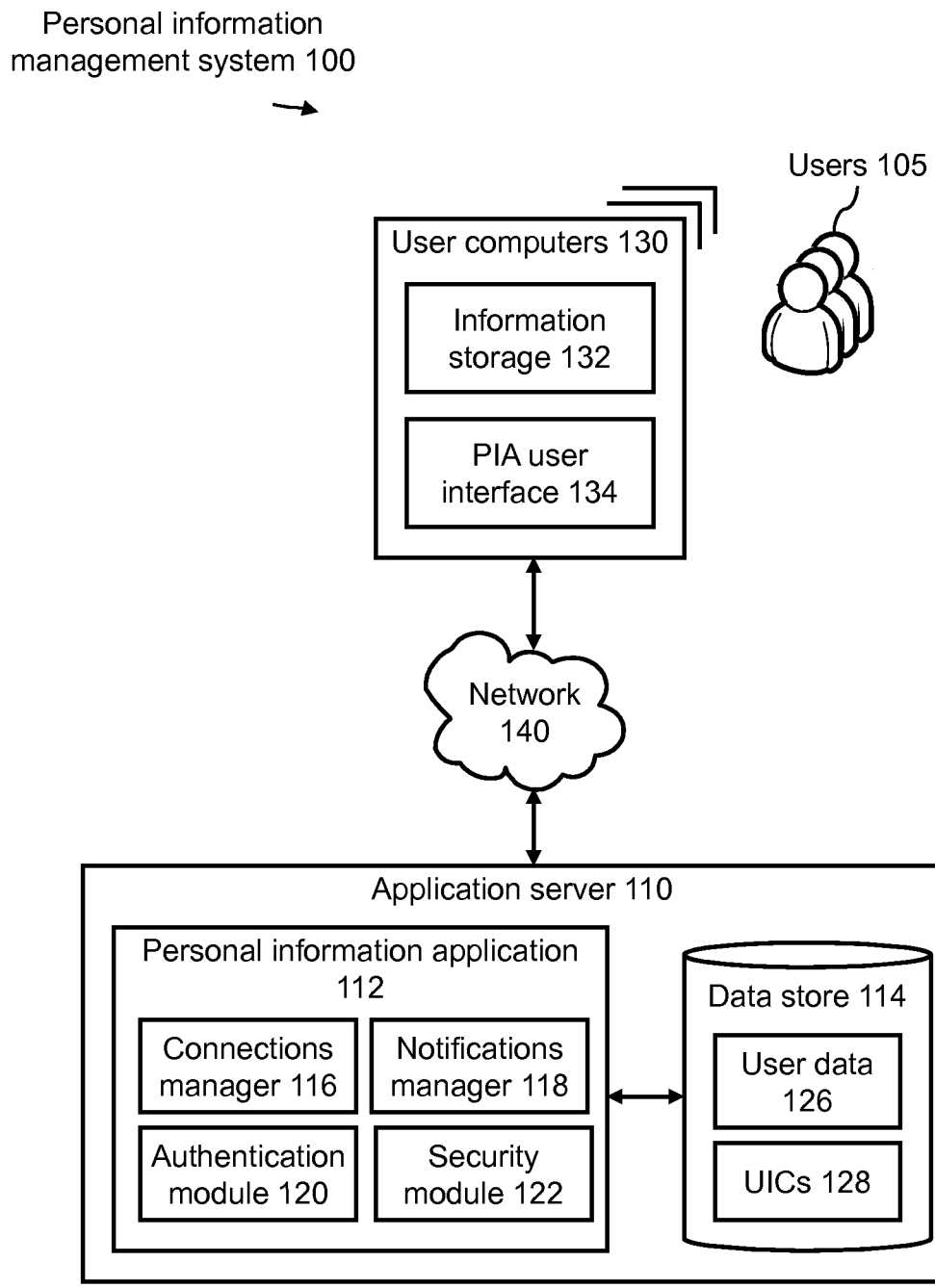
FIG. 1A illustrates a block diagram of a personal information management system for managing and distributing personal information over a network.

According to one embodiment of the present invention, FIG. 1A illustrates a block diagram of a personal information management system 100 for managing and distributing personal information over a network. Personal information management system 100 includes an application server 110 that further includes a personal information module application 112 and a data store 114. Personal information application 112 includes, for example, a connections manager 116, a notifications manager 118, an authentication module 120, and a security module 122. Stored in data store 114 are, for example, user data 126 and user information containers (UICs) 128.

A plurality of users 105 is associated with personal information management system 100. Users 105 may include individuals, groups of individuals, entities, and groups of entities, where entities can be, for example, any companies or organizations of any kind. Users 105 access application server 110 via a plurality of user computers 130, which are connected to application server 110 via a network 140. User computers 130 can be any computing devices that may include, but not limited to, desktop computers, laptop computers, handheld computing devices, mobile phones, and tablet devices.

Further, there may be certain information storage 132 on user computers 130. For a certain user, information storage 132 at his/her user computer 130 may contain personal information of other users 105. For example, information storage 132 can be an address book, contacts in an email application, contacts on a mobile phone, a customer relationship management (CRM) database of a business, and the like. Further, the certain user may have multiple sets of information storage 132. In other words, information about this certain user can be stored in multiple places of other users 105. Additionally, the information stored in information storage 132 is static, while updated/dynamic data resides at user data 126 and UICs 128 at data store 114 of personal information application 112.

Users 105 can use a personal information application user interface (PIA user interface) 134 at their respective user computers 130 to interact with personal information application 112 at application server 110 and manage their own personal information and the personal information of other users 105 that may be stored in information storage 132. PIA user interface 134 may be implemented as a web application and run in a web browser, such as Internet Explorer. However, PIA user interface 134 may be implemented by other means, such as a .NET application, a light weight desktop application, a mobile app, an API, and the like. PIA user interface 134 can also provide an API by which a third-party developer can access personal information application 112 and/or application server 110.

Additionally, users 105 can be classified as member-users 105 and guest-users 105. Member-users 105 are those users who have joined personal information management system 100 and therefore have access to personal information application 112 being executed on application server 110. By contrast, guest-users 105 are those users who have not joined personal information management system 100 and therefore do not have access to some or all of personal information application 112 being executed on application server 110, yet guest-users 105 can still receive information updates from member-users 105. Namely, guest-users 105 are granted limited access to personal information application 112. In one embodiment, guest-users 105 are granted just enough access to personal information application 112 to view/receive updates from member-users 105, such as via a secure URL.

Network 140 may be, for example, a local area network (LAN, wired or wireless) and/or a wide area network (WAN) for connecting to the Internet or to an Intranet. Application server 110 and user computers 130 may connect to network 140 by any wired and/or wireless means.

Figure 1B:
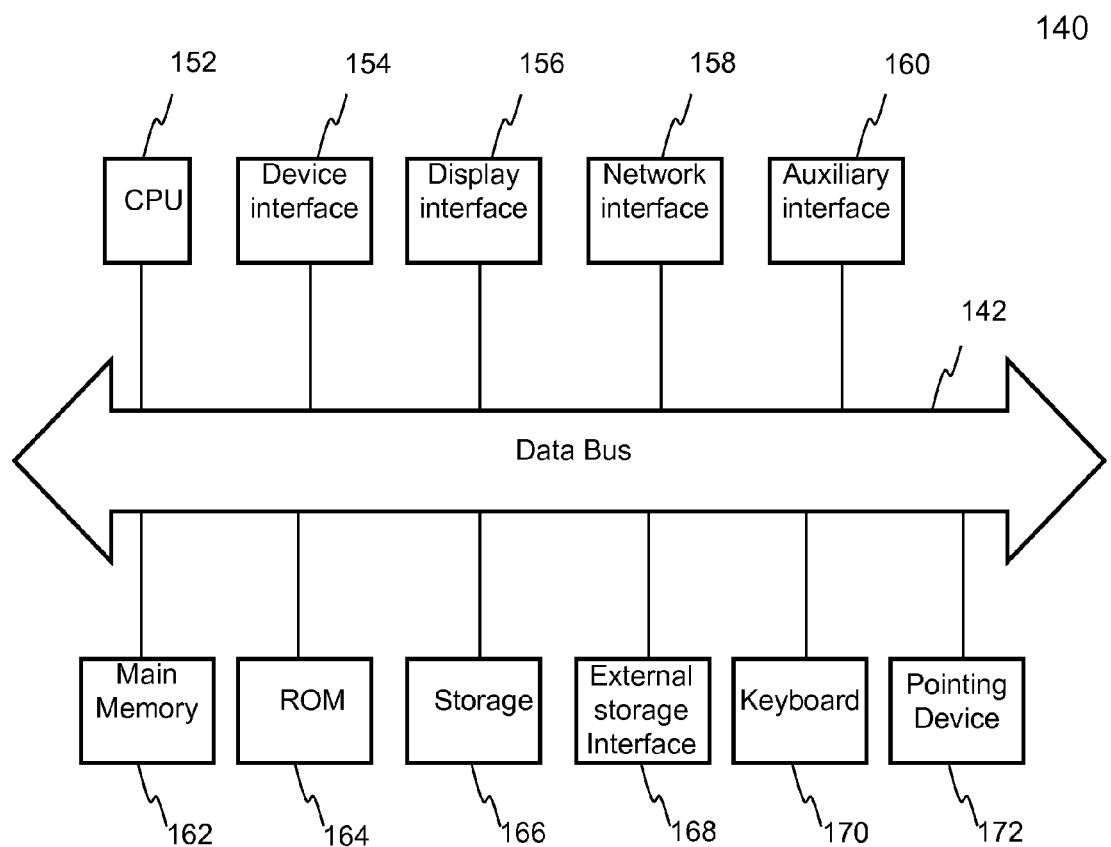
FIG. 1B shows exemplary internal construction blocks of a computing device 140 that may be implemented as server 110.

Application server 110 is implemented on one or more computing devices that can have any networked computing configuration as long as server 110 is accessible or communicates with via network 140 by other computing devices (e.g., user computers 130). FIG. 1B shows exemplary internal construction blocks of a computing device 140 that may be implemented as server 110. Computing device 140 may also be used as a client device (e.g., a computer 130 in FIG. 1A). As shown in FIG. 1B, device 140 includes a central processing unit (CPU) 152 interfaced to a data bus 142 and a device interface 154. CPU 152 executes under an operating system certain instructions to manage all devices and interfaces coupled to data bus 142 for synchronized operations. Device interface 154 may be coupled to an external device such as another computing device associated with a user or another server. Also interfaced to data bus 142 is a display interface 156, a network interface 158, an auxiliary interface 160 and an external storage interface 168. Generally, a client module, a cache module or a server module of an executable version of one embodiment of the present invention is loaded into storage 166 (or through external storage interface 168, network interface 168, device interface 154 or other interfaces coupled to data bus 142) to cause computing device 140 to perform as desired in the present invention.

Main memory 152 such as random access memory (RAM) is also interfaced to data bus 142 to provide CPU 152 with the instructions and access to memory storage 166 for data and other instructions. In particular, when executing stored application program instructions, such as personal information application 112 of FIG. 1A, CPU 152 is caused to manipulate the data to achieve results contemplated in the present invention. ROM (read only memory) 164 is provided for storing invariant instruction sequences such as a basic input/output operation system (BIOS) for operation of keyboard 170, display 156 and pointing device 172 if there are any.

It should be noted that computing device 140 shown in FIG. 1B is an example, some functional blocks are not explicitly shown. For example, a transceiver is not shown when computing device 140 is a smart phone. Likewise, not all of the functional blocks shown in FIG. 1B are necessary in a computing device needed to perform what is desired in one embodiment of the present invention.

According to one embodiment, personal information management system 100, and more particularly personal information application 112, may support a cloud computing environment. In a cloud computing environment, application server 110 is a cloud server. Further, personal information application 112 is not limited to running on one application server 110. Personal information management system 100 may include multiple application servers 110 (or cloud servers) in order to ensure high-availability of computing resources.

In one embodiment, Personal information application 112 is implemented as a software module configured to manage and distribute personal information over network 140. For example, personal information application 112 is configured or implemented to manage and distribute certain information (e.g., updated personal information) to storage 132 of users 105 over network 140. Connections manager 116 of personal information application 112 is a software module configured to create and manage connections (or links) between users 105, wherein one user may have connections with one or more other users 105. Further, the connections that are created and managed using connections manager 116 can be between or among member-users 105 as well as between or among member-users and guest-users. In one embodiment, connections can happen between or among guest-users with the assistance of server 110.

Notifications manager 118 is an application or module configured to manage various notifications on behalf of users 105. For example, when a user updates his personal information via UICs 128 in data store 114, notifications can be automatically transmitted on behalf of the user to other users who are connected to or in a relationship with the user. Further, notifications manager 118 is used to manage notifications based on how each user wishes to receive notifications from other users. For example, a user may set up his notifications to be received daily, weekly, or monthly from other users, from a group of users, and the like. Further, a user may set up his notifications to be received in a certain way, such as via email, SMS, text message, or the like.

Authentication module 120 is used to manage the authentication process of registered users of personal information management system 100. For example, when a user signs into personal information application 112, a standard authentication process is performed to allow the user 105 to access personal information application 112. User sign-in may occur in a number of ways. In one embodiment, the user may use a web browser to access PIA user interface 134 and enter credentials (e.g., username and password). In another embodiment, PIA user interface 134 is a mobile app that a user uses to enter his credentials. In yet another example, the user sign-in process may occur automatically when the user starts the mobile app.

Security module 122 is used to perform any system security functions with respect to keeping the contents of user data 126 and UICs 128 secure. Security module 122 may use standard security techniques, such as encryption, secure hashtags (or hash tags), and the like.

Data store 114 can be, for example, data repositories (like databases) and/or flat files that can store data. Further, personal information management system 100 is not limited to one data store 114 only. Personal information management system 100 may include multiple data stores 114. As users 105 join personal information management system 100, user information is stored in user data 126 in data store 114. User data 126 may contain, for example, account information, user names, group names, user/group credentials, and the like.

UICs 128 in data store 114 are files that contain personal information about users 105. There is a unique UIC 128 for each user 105. Each user can manage the type and amount of personal information in his/her own UIC 128. Each user can manage the portions of the contents of his/her own UIC 128 that he/she wishes to share with any other user 105. Each unique UIC 128 can contain, but is not limited to, name, gender, one or more addresses (e.g., home address, work address, summer address), one or more phone numbers (e.g., home phone, work phone, cell phone), one or more email addresses (e.g., home email, work email, any other email), one or more credit card numbers, social security number, one or more bank account numbers, one or more events (e.g., wedding anniversary, birthdays), and the like. Again, information stored in information storage 132 on user computers 130 is static, while updated/dynamic data resides at user data 126 and UICs 128 at data store 114 on server 110. More details of an example of the content of an exemplary UIC are shown and described below.

Figure 2:
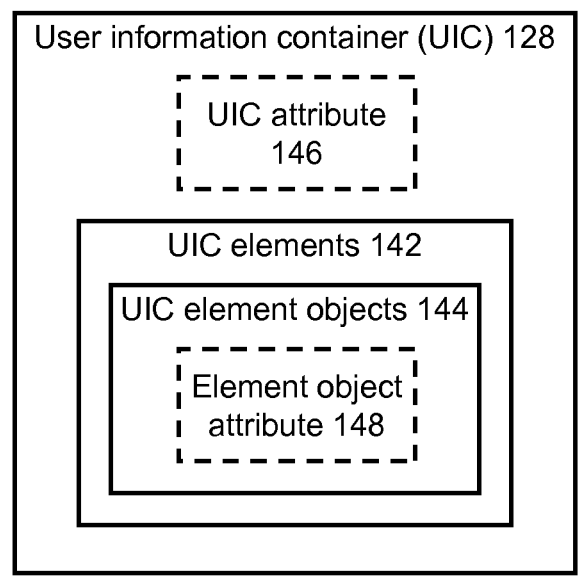
FIG. 2 illustrates a block diagram of a user information container of the personal information management system of FIG. 1A.

FIG. 2 illustrates a block diagram of an example of a UIC 128 of personal information management system 100 of FIG. 1A. Each unique UIC 128 stored in user data 126 includes, for example, one or more UIC elements 142, wherein each UIC element 142 can include one or more UIC element objects 144. Each UIC element 142 in UIC 128 contains a different type of information about the user 105. For example, one UIC element 142 contains a name (a name-UIC element 142), another UIC element 142 contains a gender (a gender-UIC element 142), yet another UIC element 142 contains address information (an address-UIC element 142). In like manner, UIC elements 142 can include a phone-UIC element 142, an email-UIC element 142, a payment-UIC element 142, an event-UIC element 142, and the like.

Again, one UIC element 142 can include one or more UIC element objects 144. A UIC element object 144 is a record of information. For example, if a user has three phone numbers, the phone-UIC element 142 may include three UIC element objects 144. For example, a first UIC element object 144 in the phone-UIC element 142 contains a home number, a second UIC element object 144 in the phone-UIC element 142 contains a work number, and a third UIC element object 144 in the phone-UIC element 142 contains a cell number. In another example, a first UIC element object 144 in the address-UIC element 142 contains a home address and a second UIC element object 144 in the address-UIC element 142 contains a work address.

Figure 3A:
FIGS. 3A and 3B show one example of coding the user information container of FIG. 2.
Figure 3B:

FIGS. 3A and 3B show together one example of coding UIC elements 142 and UIC element objects 144 in an exemplary UIC 128. In this example, the UIC 128 is coded using JavaScript Object Notation (JSON). Depending on implementation, UIC 128 can be coded in other ways, such as in XML format. FIGS. 3A and 3B show that the code for UIC 128 includes, for example, a PIA-UIC element 142*a* with one UIC element object 144, a name-UIC element 142*b* with one UIC element object 144, a gender-UIC element 142*c* with one UIC element object 144, an event-UIC element 142*d* with one UIC element object 144, an address-UIC element 142*e* with one UIC element object 144, an email-UIC element 142*f* with two UIC element objects 144, a phone-UIC element 142*g* with two UIC element objects 144, and payment-UIC element 142*h* with one UIC element object 144.

PIA-UIC element 142*a* is an UIC element that provides reference to personal information application 112 itself. The UIC element object 144 of PIA-UIC element 142*a* includes attributes, such as "network_country," "network_id," and "connect_id." The "connect_id" attribute is, for example, a CONNECTION ID that is referenced in FIGS. 5, 6, and 7.

The "network_country" and "network_id" attributes exist to allow a user 105 to specify where they want their master UIC 128 to be located. For example, if a user is a U.S. citizen, this user may prefer his/her UIC 128 to be stored in the United States. However, if a user is a citizen of Sweden, this user may prefer his/her UIC 128 to be stored in Sweden. In another scenario, if personal information management system 100 allows "mini" servers to run on a personal device (e.g., a smart phone or iPad), then the phone or iPad becomes a server that is part of the personal information management system 100. In this case, the phone or iPad also becomes a master UIC 128 data store for the user. Therefore, while FIG. 1A shows personal information application 112 residing at application server 110, it is possible for personal information application 112 to be running on any computing device that is connected to network 140. For example, personal information application 112 can be running on one or more of user computers 130.

It should be noted that a UIC can include metadata. For example, there is a "metadata" field in address-UIC element 142e and in phone-UIC element 142g. Further, certain information in a UIC can be verified by the user. For example, there is an "object verified" field in address-UIC element 142e, email-UIC element 142f, phone-UIC element 142g, and payment-UIC element 142h. Absence of the "object verified" field indicates that the information in the UIC element object 144 is not verified.

Referring again to FIG. 2, optionally, UIC 128 can include a UIC attribute 146, which can contain additional data about the UIC 128, such as metadata. Optionally, a UIC element object can include an element object attribute 148, which can be, for example, key/value pairs, such as metadata, object_verified, phone_number, etc. Additionally, UIC 128 can include a link to a photo or to any other file of the user 105 using a photo-UIC element. Namely, instead of embedding an actual digital photo in a UIC, which can make the UIC very large and consume large amounts of data store 114, the UIC element object of the photo-UIC element in UIC 128 can include a link or path to a remote (separate) secure data store (not shown) in which the digital photo is stored. In this way, when a user changes his/her photo, the new photo is automatically referenced.

Figure 4:
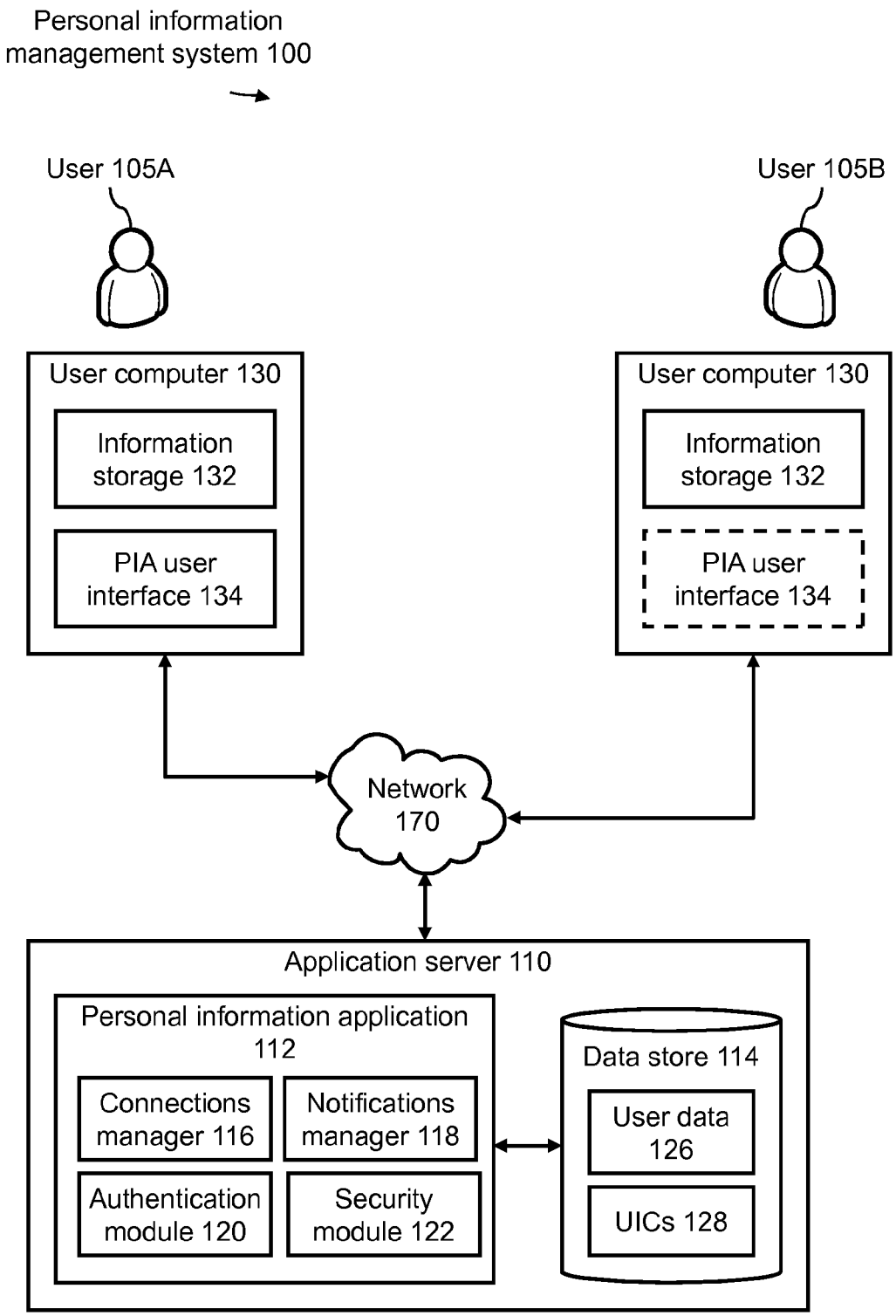
FIG. 4 illustrates another block diagram of the personal information management system for managing and distributing personal information between, for example, two users.
Figure 5:
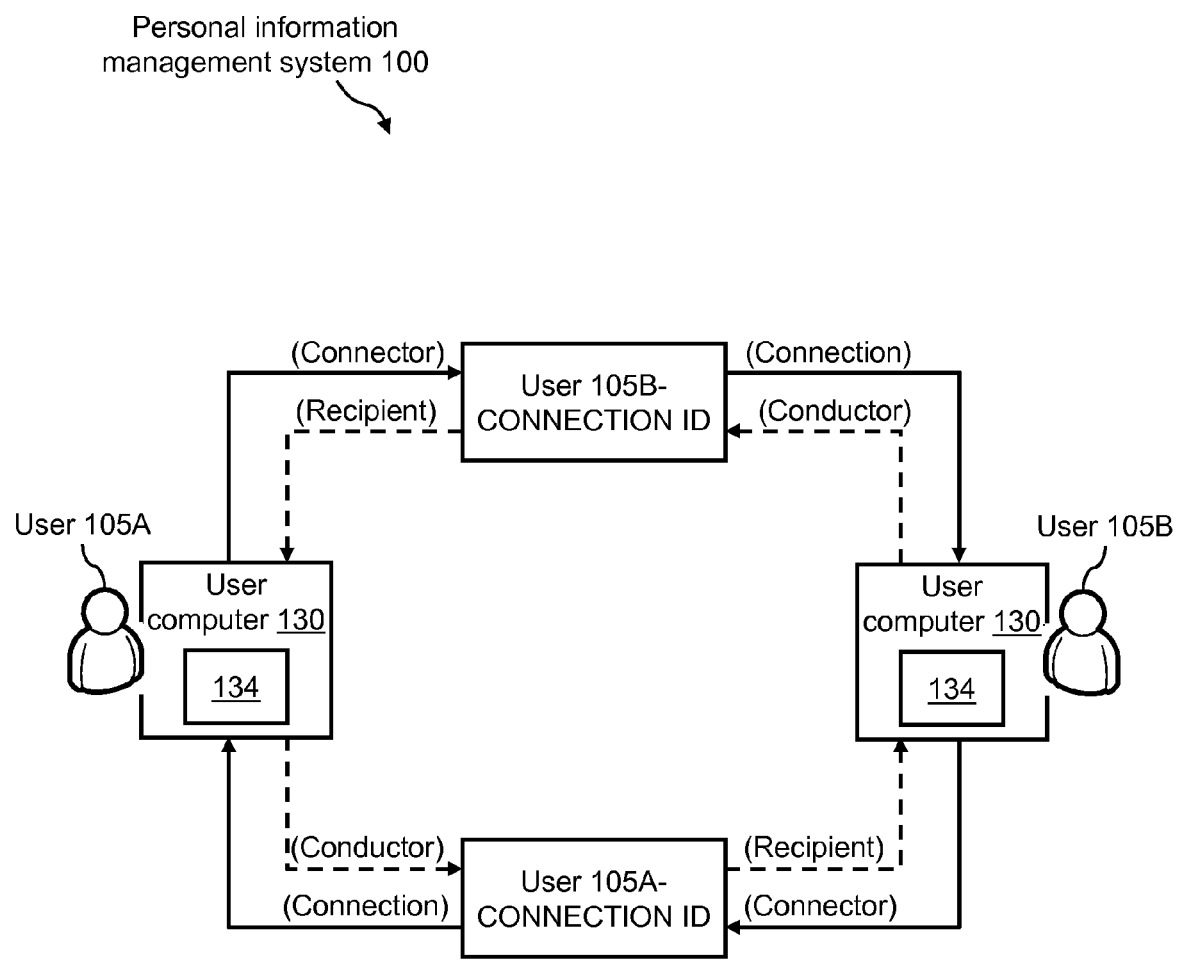
FIG. 5 illustrates a schematic diagram of the communication links between two users of the personal information management system of FIG. 1A, according to a minimum configuration.
Figure 6:
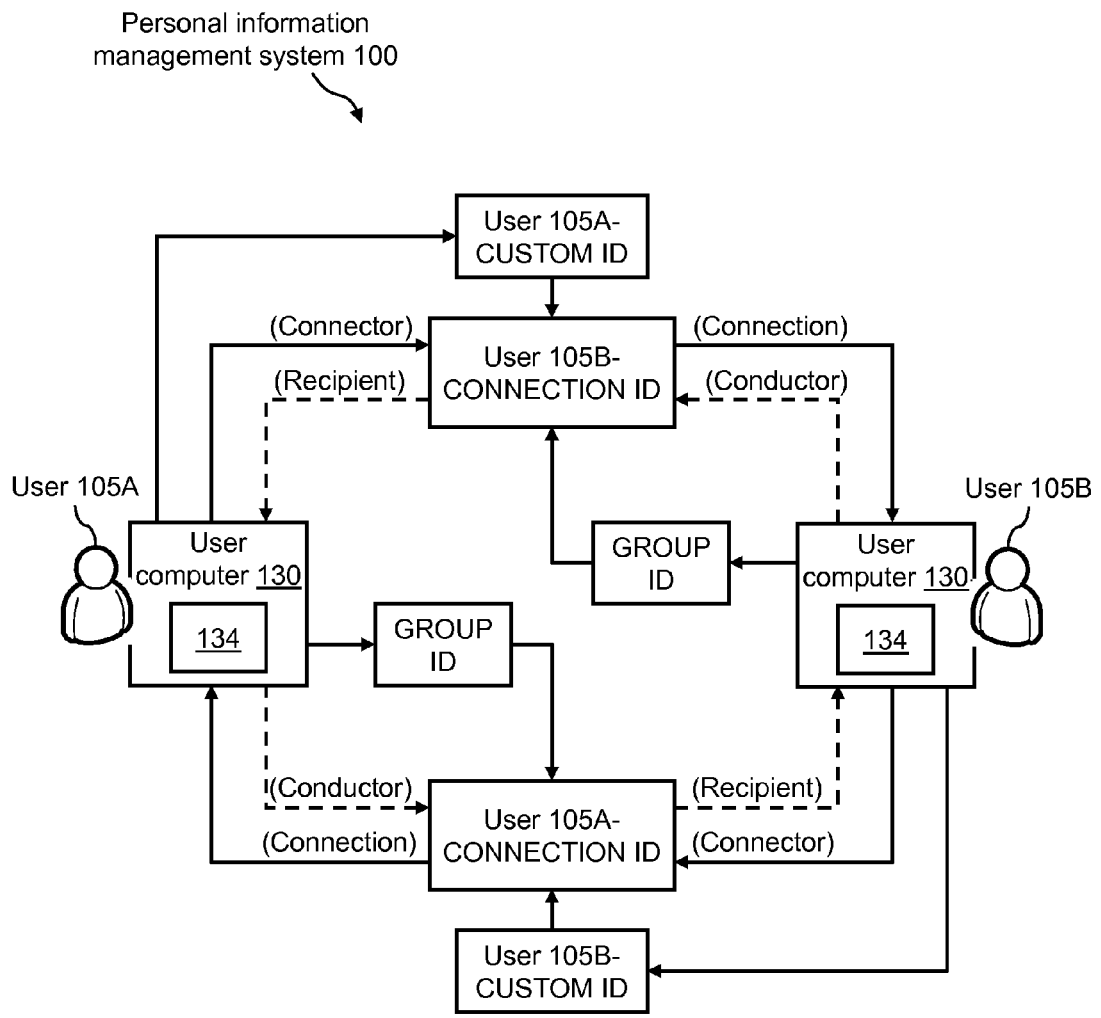
FIG. 6 illustrates a schematic diagram of the communication links between two users of the personal information management system of FIG. 1A, according to an expanded configuration.
Figure 7:
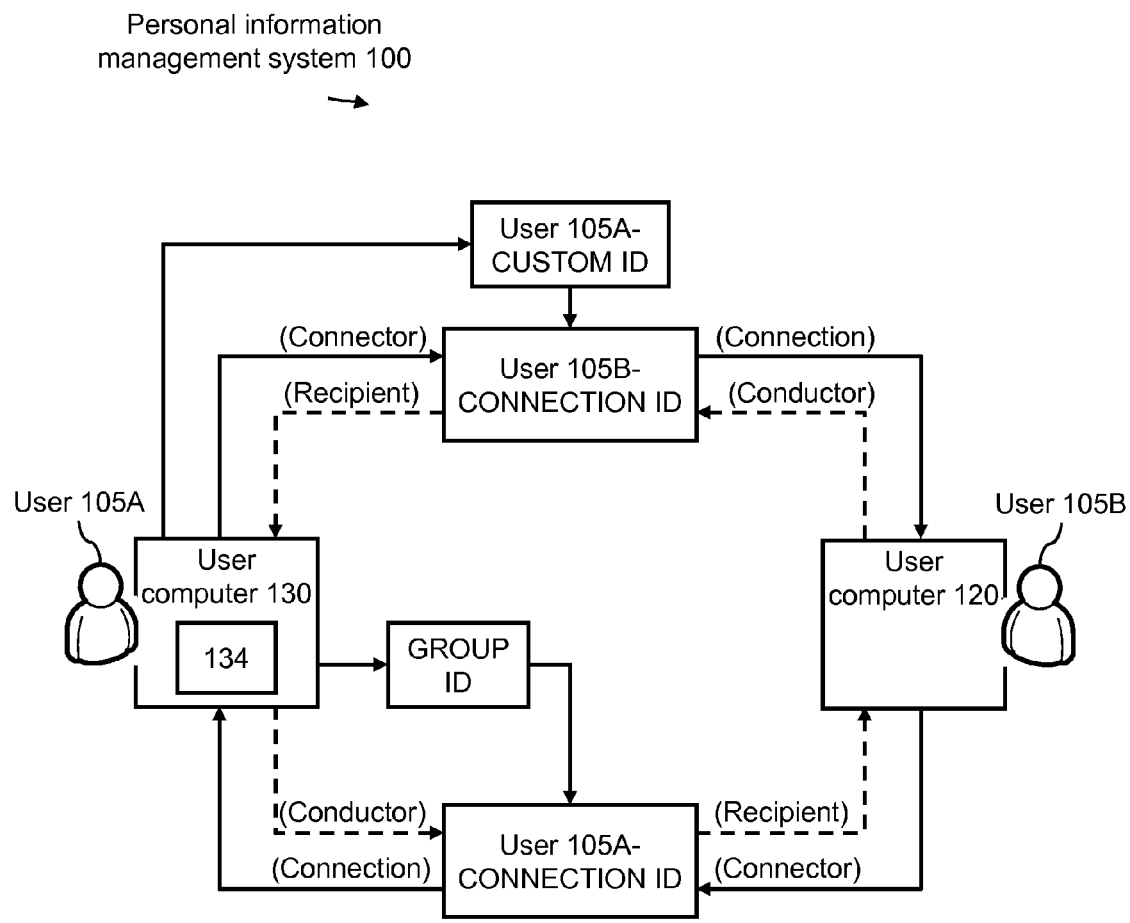
FIG. 7 illustrates a schematic diagram of the communication links between two users of the personal information management system of FIG. 1A, according to yet another configuration.

FIG. 4 illustrates another block diagram of personal information management system 100 for managing and distributing personal information between, for example, two users. In this example, a user 105A and a user 105B are associated with personal information management system 100, wherein user 105A is a member-user and user 105B can be either a member-user or a guest-user. FIGS. 5, 6, and 7 to follow describe examples of connections (or links) that are possible between user 105A and user 105B in personal information management system 100.

FIG. 5 illustrates a schematic diagram of the communication links between two users in personal information management system 100 of FIG. 1A, according to one embodiment of the present invention. In this example, user 105A is a member-user 105 and user 105B can be either a member-user or a guest-user. Connections manager 116 of personal information application 112 manages the process of establishing links between any two users (i.e., their respective computing devices).

First, user 105A establishes a relationship with user 105B by, for example, adding an individual or an entity to his contacts list on a smart phone he is using. The entry may stay in the local memory or storage of the smart phone or be uploaded to server 110 of FIG. 1A. In so doing, a connection or link is created between user 105A and user 105B, which is shown as user 105B-CONNECTION ID. With respect to user 105B-CONNECTION ID, user 105B is the "connection" and user 105A is the "connector." This means that user 105B manages the user 105B-CONNECTION ID and that user 105A is connected to the user 105B-CONNECTION ID.

Next, when user 105A initiates the relationship with user 105B, a connection is automatically created for user 105B to user 105A. At first, this connection is flagged as "pending." For example, a connection or link is automatically created between user 105B and user 105A, which is shown as user 105A-CONNECTION ID. With respect to user 105A-CONNECTION ID, user 105B is the "connector" and user 105A is the "connection." This means that user 105A manages the user 105A-CONNECTION ID and that user 105B is connected to the user 105A-CONNECTION ID.

User 105A-CONNECTION ID and user 105B-CONNECTION ID are unique connection identifiers between the two entities, user 105A and user 105B. There will always be a CONNECTION ID for each of users 105. The CONNECTION IDs are stored in user data 126 and in UICs 128 stored in data store 114. User 105A-CONNECTION ID belonging to user 105A is specific for user 105B. The user 105A-CONNECTION ID is used to push information from user 105A to user 105B. Similarly, user 105B-CONNECTION ID belonging to user 105B is specific for user 105A. The user 105B-CONNECTION ID is used to push information from user 105B to user 105A. For example, if user 105A wants to connect to another user, a different user 105A-CONNECTION ID is created that is specific for user 105C. In other words, a specific identifier is created for each of the users that have established a relationship with an individual.

It is assumed that user 105A is a registered or member user. The user 105B-CONNECTION ID and the user 105A-CONNECTION ID are created regardless of whether user 105B is a member-user or a guest-user. Even if user 105B is a temporary guest-user on the network, user 105A can share his/her personal information with user 105B. However, if user 105B is a guest-user, user 105B may not be able to share his/her personal information with user 105A. Even so, a link (i.e., user 105B-CONNECTION ID) has been established and retained for user 105B. Therefore, if user 105B decides later to join personal information management system 100, then the link is already present. If user 105B is a member-user, then user 105B will be able to share user 105B-CONNECTION ID with user 105A. However, if user 105B is a guest-user 105, then user 105B may not be able to share user 105B-CONNECTION ID with user 105A. Referring again to FIG. 5, at the point an outer connection loop is created in which the direction of information flow is clockwise (CW).

Next, an inner connection loop is shown in which the direction of information flow is counter-clockwise (CCW). For example, now that user 105A has created the first connection process (the outer loop), user 105A can share his/her personal information with user 105B. Namely, with respect to user 105A-CONNECTION ID, user 105A is the "conductor" and user 105B is the "recipient." This means that for any information that is shared through user 105A-CONNECTION ID, user 105A is the conductor of that information and user 105B is the recipient of that information. In like manner, with respect to user 105B-CONNECTION ID, user 105B is the "conductor" and user 105A is the "recipient." This means that for any information that is shared through user 105B-CONNECTION ID, user 105B is the conductor of that information and user 105A is the recipient of that information.

The aforementioned flow allows user 105B, who may not be a member-user, to receive the information of user 105A even though user 105B is not a member-user 105. This allows pragmatic guest-users to take their time to decide whether to join personal information management system 100. However, user 105B (a guest-user 105) still benefits from the network. For example, if user 105A (a member-user 105) updates his/her personal information, a secure link (e.g., URL) that is specific only to user 105A is created and user 105B is chosen to send the link to user 105B. User 105A (the "conductor") is sharing information with user 105B (the "recipient"). This allows user 105B to have a secure link that will never change unless the user 105B (guest-user) becomes a member. At that time, the secure link will cease to exist, instead, the now member-user is required to login and be authenticated to personal information application 112. The same link is used no matter how many times user 105B views the link or no matter how many times user 105A has updated his/her information. The secure link allows user 105B to view only what user 105A is sharing with user 105B. That is, user 105A controls what information he/she wants to share with any other entity.

FIG. 6 illustrates a schematic diagram of the communication links between two users in view of personal information management system 100 of FIG. 1A, according to one embodiment of the present invention. In this example, user A is a member-user and user B is also a member-user. Two additional features of personal information management system 100 are shown in FIG. 6: CUSTOM IDs and GROUP IDs. One of the purposes of CUSTOM IDs is to manage personal information of a user that may be stored by another user in multiple places, in which case, a GROUP ID is used to manage privacy settings for some or all of the information at the multiple places.

In one embodiment, user A may have personal information about user B stored in several places (e.g., stored in different instances of information storage 132 on one or more of his/her user computers 130). For example, user A may have personal information about user B stored in his/her phone contacts, email contact, and, if user A is a business, also in a CRM system. Therefore, user A is provided a user A-CUSTOM ID that references (points to) these different instances of information storage 132 to the user B-CONNECTION ID of user B, which is an identifier specific to personal information management system 100. For example, if user A is a business entity, there may be personal information about user B storing in both the billing database and/or the customer service database. Accordingly, user A-CUSTOM ID allows the business entity to correlate user B-CONNECTION ID to customer #1989Y73, which is user B, in either one or both of the databases.

In similar fashion, user B is provided a user B-CUSTOM ID that points these different instances of information storage 132 to the user A-CONNECTION ID of user A. Another feature of the CUSTOM ID is that if, for example, the record of the user B-CONNECTION ID for user B is lost, then user A can query his/her user A-CUSTOM ID and look up the user B-CONNECTION ID of user B.

The CUSTOM ID can be any string of numbers and/or characters. In one embodiment, the CUSTOM ID can be a sensitive ID, such as social security number, a credit card number, a bank account number, a healthcare record number, a customer number, and the like. Because the CUSTOM ID can be a sensitive ID, a security module 122 in FIG. 4 applies certain security measures to the CUSTOM ID (e.g., using a hash function) so that the CUSTOM ID is converted into a secure hash that cannot be reversed.

According to one embodiment, a department store or an online store collects initial information about a shopper through a purchase by a shopper. The initial information may be simply a name, a home or email address, a phone number and a credit card number, and perhaps what the shopper has purchased. The initial information may be used for the store to send advertisement information to the shopper. When the shopper needs to update some of the initial information stored by the store (e.g., the shopper has moved or received a new credit card), the shopper may rely upon one of the embodiments of the present invention to update the information stored with the store without releasing certain information (e.g., the credit card number) to other contacts. On the side of the store, for example, before sending out a promotion to its customers, the store updates its database via a link for the specific shopper or links for its registered shoppers from a server operating the personal information management system. As a result, the store can always use the latest information to reach its customers while one of its customers can always close transactions without manually updating his/her account with a new credit card number. Depending on implementation, the store may be a member user or a non-member user of the personal information management system.

As shown and described in FIGS. 2, 3A, and 3B, a UIC 128 for a user can include multiple types of personal information, such as, but not limited to, gender information, address information, phone information, email information, credit card information, a social security number, bank account information, events information, and the like. However, the user may wish to limit the types and amount of personal information they wish to share with any other member-user or guest-user. According to one embodiment, a user could apply privacy settings to each of the other users 105 individually, but this would be time consuming. Instead, the user can create one or more groups (e.g., a family group, a work group), the assign proper users to one or more of the groups. By applying different privacy settings to each of the groups, the user can effectively control what information may be released or updated to which group.

In one embodiment, a user creates a FAMILY GROUP, a FRIENDS GROUP, and a STORE GROUP, wherein each GROUP contains at least one other user. The privacy settings for FAMILY GROUP allow name, home phone, work phone, cell phone, personal email, work email, home address, work address, and events of the user to be viewed by those other users that have been assigned to this FAMILY GROUP. The privacy settings for FRIENDS GROUP allow name, home phone, cell phone, personal email, and home address of the user to be viewed by those other users that are assigned to this FAMILY GROUP. The privacy settings for STORE GROUP allow name, cell phone, personal email, and credit card number of the user to be viewed by those other users that are assigned to this STORE GROUP. Accordingly, FIG. 6 shows that the user 105A-CONNECTION ID of user 105A is assigned to a certain GROUP ID and that the user 105B-CONNECTION ID of user 105B is assigned to a certain GROUP ID.

FIG. 7 illustrates a schematic diagram of the communication links between two users of personal information management system 100 of FIG. 1A, according to yet another embodiment of the present invention. User 105A is a member-user and user 105B is a guest-user. Because user 105B is a guest-user and does not have access to the personal information application being executed on a computing device, user 105B cannot assign user 105A to a GROUP and there can be no CUSTOM ID for user 105B. Further, even though user 105B is a guest-user, personal information application 112 can create and then store a temporary UIC 128, or at least an email record or any other information, for the guest-users in data store 114.

Figure 8A:
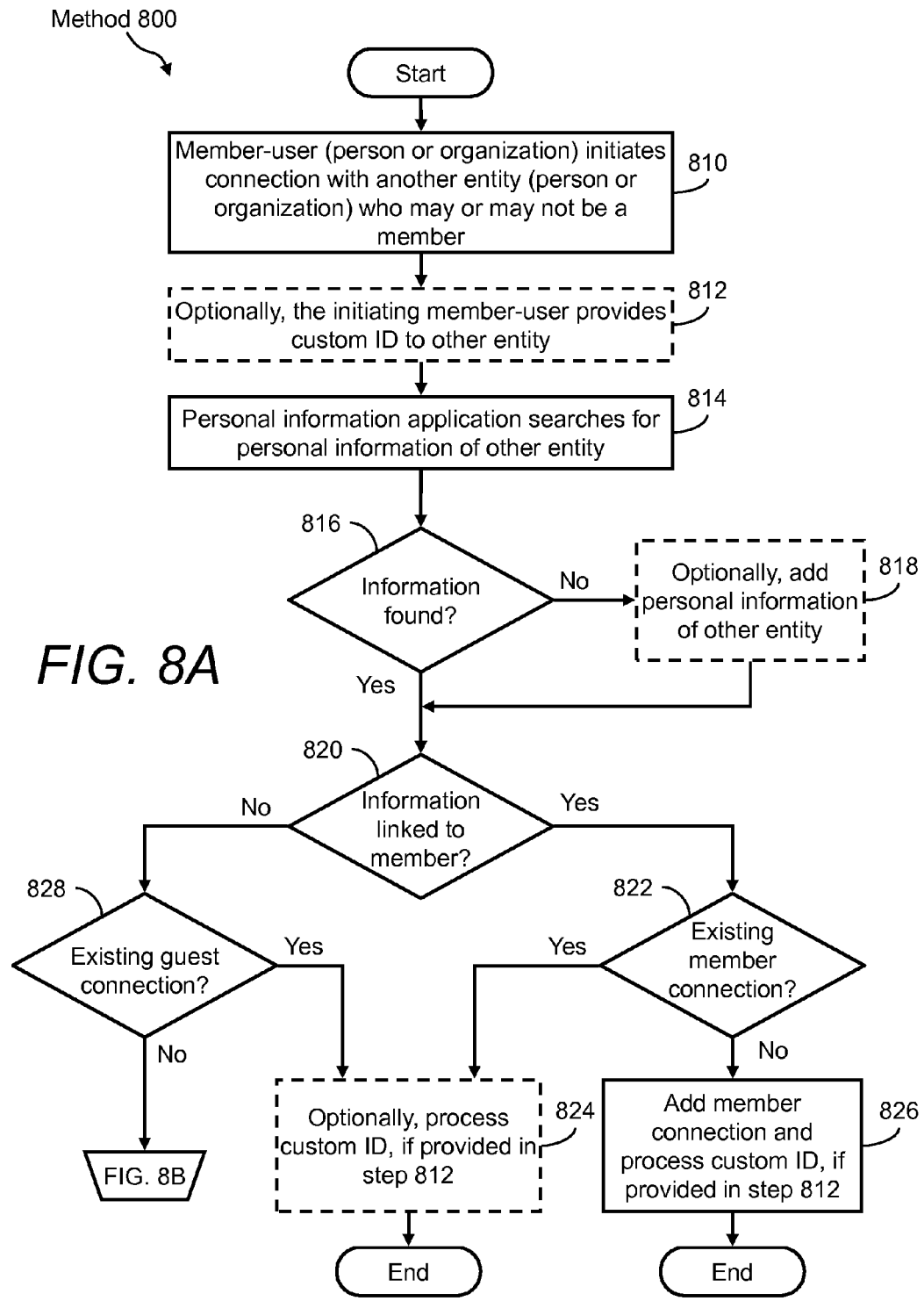
FIGS. 8A and 8B illustrate a flow diagram of an example of a method of establishing the communication links between two users in the personal information management system of FIG. 1A.
Figure 8B:
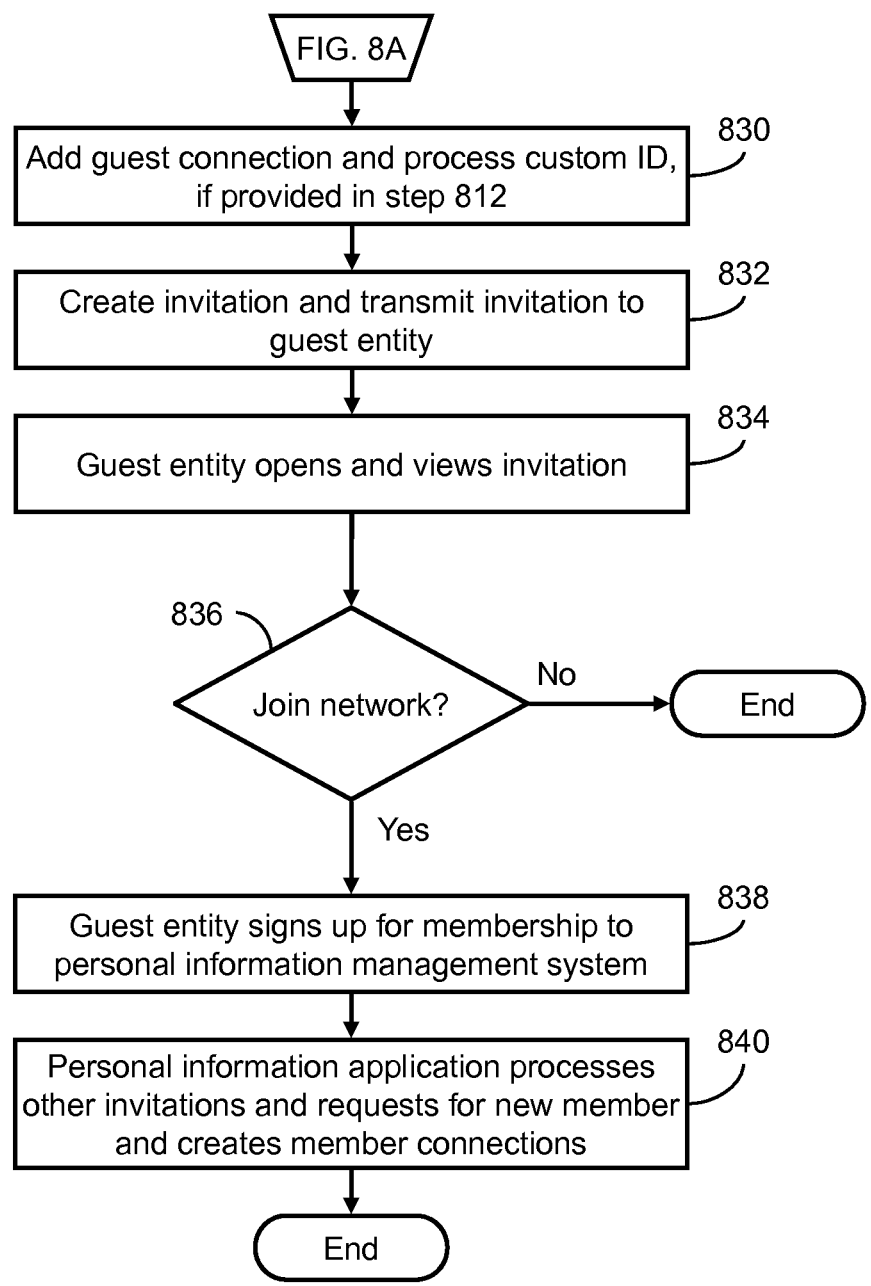

FIGS. 8A and 8B illustrate a flowchart or process 800 of establishing the communication links between two users accessing personal information management system 100 of FIG. 1A. The process 800 may be implemented in software, hardware or a combination of both software and hardware as a method, a system or a part of a system. The process 800 may be understood in conjunction with the foregoing drawings.

At 810, a member-user (e.g., a person or an organization) initiates a connection with another entity (e.g., a person or an organization) who may or may not be a member-user. In one example and referring again to FIGS. 4, 5, 6, and 7, using PIA user interface 134, user 105A initiates a connection with another entity, such as user 105B, by adding user 105B to his/her contacts list. User 105B may be a member-user 105 or a guest-user 105. By initiating a connection, connections manager 116 is configured to create a user 105A-CONNECTION ID between user 105A and user 105B.

Optionally at 812, the initiating member-user 105A provides a CUSTOM ID to the other entity. The initiating member-user 105A can manually create the CUSTOM ID or personal information application 112 can automatically generate the CUSTOM ID. For security, once the CUSTOM ID is created or generated, security module 122 can be used to convert the CUSTOM ID into a secure hash that cannot be reversed. Continuing the example, user 105A provides a CUSTOM ID to user 105B. This is optional because the initiating user 105A may or may not intend to store the information of user 105B in multiple places.

At 814, personal information application 112 searches for personal information of other entity, namely, personal information application 112 searches user data 126 and/or UICs 128 in data store 114. Continuing the example, personal information application 112 searches user data 126 and/or UICs 128 in data store 114 for personal information (e.g., name, email, phone, address, credit card number, etc) about user 105B, who may be a member-user or a guest-user.

At 816, based on the search performed at 814, personal information application 112 determines whether personal information of other entity is present. Continuing the example, personal information application 112 determines whether personal information (e.g., name, email, phone, address, credit card number, etc) about user 105B is present in user data 126 and/or UICs 128 in data store 114. If information is not present, then process 800 proceeds to step 818. However, if such information is present, then process 800 proceeds to step 820.

Optionally at 818, the personal information of the other entity is added to data store 114. Continuing the example, the personal information (e.g., name, email, phone, address, credit card number, etc) about user 105B that is provided by user 105A at 810 is added to user data 126 and/or UICs 128 in data store 114.

At 820, personal information application 112 determines whether the information is linked to a member-user. Continuing the example, personal information application 112 determines whether the information is linked to a member-user 105A; namely, whether user 105B is a member-user. For example, the information found at 814 indicates whether user 105B is a member-user. If the information is linked to a member-user, namely, if user 105B is a member-user, then process 800 proceeds to 822. However, if the information is not linked to a member-user, namely, if user 105B is a guest-user, then process 800 proceeds to 828.

At 822, personal information application 112 determines whether a member connection already exists. Continuing the example, connections manager 116 of personal information application 112 queries the network to determine whether user 105B-CONNECTION ID (in the form of a member connection) already exists between user 105A and user 105B. If there is an existing member connection, then process 800 proceeds to 824. However, if there is not an existing member connection, then process 800 proceeds to 826.

At 824, the CUSTOM ID, if provided at 812, is processed. Continuing the example, the CUSTOM ID of user 105A is associated with the user 105B-CONNECTION ID regardless of whether user 105B-CONNECTION ID is a guest or member connection.

At 826, the member connection is added and the CUSTOM ID, if provided at 812, is processed. Continuing the example, connections manager 116 of personal information application 112 creates the user 105B-CONNECTION ID between user 105A and user 105B. The CUSTOM ID of user 105A, if provided at 812, is associated with the user 105B-CONNECTION ID.

At 828, personal information application 112 determines whether a guest connection already exists. Continuing the example, connections manager 116 of personal information application 112 queries the network to determine whether user 105B-CONNECTION ID (in the form of a guest connection) already exists between user 105A and user 105B. If there is an existing guest connection, then process 800 proceeds to 824. However, if there is not an existing guest connection, then process 800 proceeds to 830.

At 830, personal information application 112 adds a guest connection and the CUSTOM ID, if provided at 812, is processed. Continuing the example, connections manager 116 of personal information application 112 creates user 105B-CONNECTION ID (in the form of a guest connection) between user 105A and user 105B. The CUSTOM ID of user 105A, if provided at 812, is associated with the user 105B-CONNECTION ID. Process 800 proceeds to 832.

At 832, an invitation is created and transmitted to the guest entity. Continuing the example, an invitation is created and transmitted to user 105B. For example, notifications manager 118 generates a notification (e.g., email, SMS, text message) and transmits the notification to user 105B. Once the notification is received, user 105B can choose whether to accept the connection or reject the connection. The contents of the notification can include, for example, a secure URL that user 105B can use to accept the connection and to view the personal information of user 105A, not the information of user 105B him/herself. The connection is in a pending state until user 105B accepts the connection. Further, the notification to user 105B can include an invitation to join personal information management system 100 and become a member-user 105. Process 800 proceeds to 834.

At 834, the guest entity opens and views the invitation. Continuing the example, user 105B opens and views the invitation. Process 800 proceeds to 836.

At 836, the guest entity decides whether to join personal information management system 100 and become a member-user or to remain a guest-user. Continuing the example, user 105B decides whether to join personal information management system 100 and become a member-user or to remain a guest-user. If the guest-user wishes to join personal information management system 100, then process 800 proceeds to 838. However, if the guest-user does not wish to join personal information management system 100, then process 800 ends.

At 838, the guest entity signs up for membership to personal information management system 100. Continuing the example, user 105B signs up for membership to personal information management system 100. Process 800 proceeds to 840.

At 840, personal information management system 100 processes invitations and requests for the new member and creates the member connections. Continuing the example, personal information management system 100 processes invitations and requests for user 105B, who is now a member-user, and creates member connections of user 105B with other users.

Figure 9A:
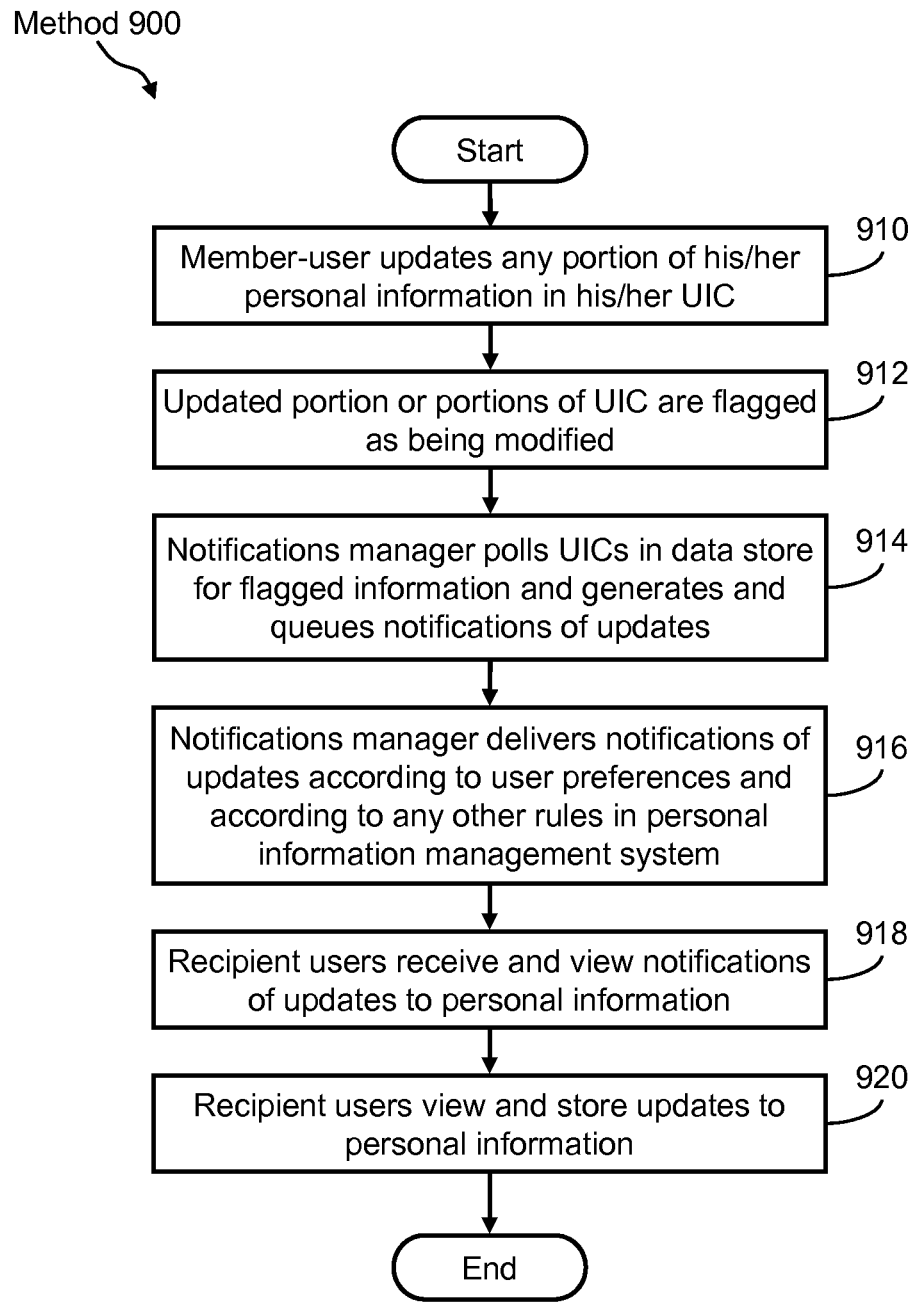
FIG. 9A illustrates a flow diagram of an example of a method of automatically distributing personal information using the personal information management system of FIG. 1A.

FIG. 9A illustrates a flow chart or process 900 of automatically distributing personal information using personal information management system 100 of FIG. 1A. Generally, personal information application 112, processing updates of UICs 128 can be, for example, automatic via "push" (versus polling/pulls), i.e., personal information application 112 automatically pushes an update to the receiving entity without having to wait for the entity to "poll" for updates.

Process 900 may be implemented in software, hardware or a combination of both software and hardware as a method, a system or a part of a system. The process 900 may be understood in conjunction with the foregoing drawings. At 910, a member-user updates any portion of his/her personal information in his/her UIC 128. For example, the member-user 105 uses PIA user interface 134 to update information in any UIC element object 144 of any UIC element 142 in his/her UIC 128. For any UIC element object 144 that is updated, the modification date in the UIC element object 144 is changed and the version of the UIC element object 144 is changed. The updated UIC 128 is stored in data store 114. It shall be noted that "object_modified" is a key/value pair, which is an example of an element object attribute 148. Also, "version" is an example of an element object attribute 148.

At 912, in data store 114, the portion or portions of the UIC 128 of the member-user that are updated are flagged as being modified. For example, if the member-user 105 changes one of his/her phone numbers, then the information in one UIC element object 144 of the phone-UIC element 142 is updated. As a result, this UIC element object 144 of the phone-UIC element 142 is flagged as being modified.

At 914, notifications manager 118 continuously polls UICs 128 in data store 114 for flagged information and generates and queues notifications of updates to the intended recipient-user (e.g., to all the user connections). The recipients can include both member-users and guest-users determined by the user. For guest-users, the contents of notifications can include, for example, a secure URL to view a copy of the updated personal information, whereas member-users can simply access personal information application 112.

At 916, notifications manager 118 delivers the notifications of updates according to user preferences. For example, a certain user may set up his/her notifications to be automatically received daily, weekly, monthly, from individual users, from groups of users, and the like. Additionally, a user can specify to receive no notifications, as they prefer to check for updates manually at their discretion. Further, a user may set up his/her notifications to be received in a certain way, such as via email, SMS, text message, and the like. Further, personal information updates can be compiled into a compressed file, as specified respectively by the member-users, that can be downloaded and processed at the discretion of the member-users. For example, member-users can specify the contents of the compressed file to include only UICs 128 that have been updated in the last month, to include only updated portions not the entirety, to include specified portions only, such as updated phones and emails only, and so on.

Additionally, notifications manager 118 delivers the notifications of updates according to any other rules in personal information management system 100. For example, notifications are not necessarily sent out in real time as updates occur. Instead, notifications may be delayed slightly.

At 918, recipient users 105 receive and view notifications of updates. For example, guest-users may receive notifications via email, SMS, or text message, whereas member-users can simply access personal information application 112 to receive the notifications.

At 920, recipient users view and store the personal information updates. For example, recipient users view and store the personal information updates in their respective information storage 132.

In summary, personal information management system 100 and processes 800 and 900 provide mechanisms by which users can update their personal information in one place and then the updated information is automatically distributed to other users. Further, the personal information management system 100 includes mechanisms by which users can manage what portion or portions of their personal information is shared with which of the other users, wherein the personal information shared with one recipient can be different from the personal information shared with another recipient. The personal information management system 100 disclosed herein provides benefit over conventional manual methods of distributing updated personal information in that it is capable of automatically distributing updated personal information to any entities with which a user has a relationship. Further, the connection between one user and another user persists indefinitely over time so that updated personal information can be distributed without the user having to remember every entity with which he/she has a relationship over a period of time.

Figure 9B:
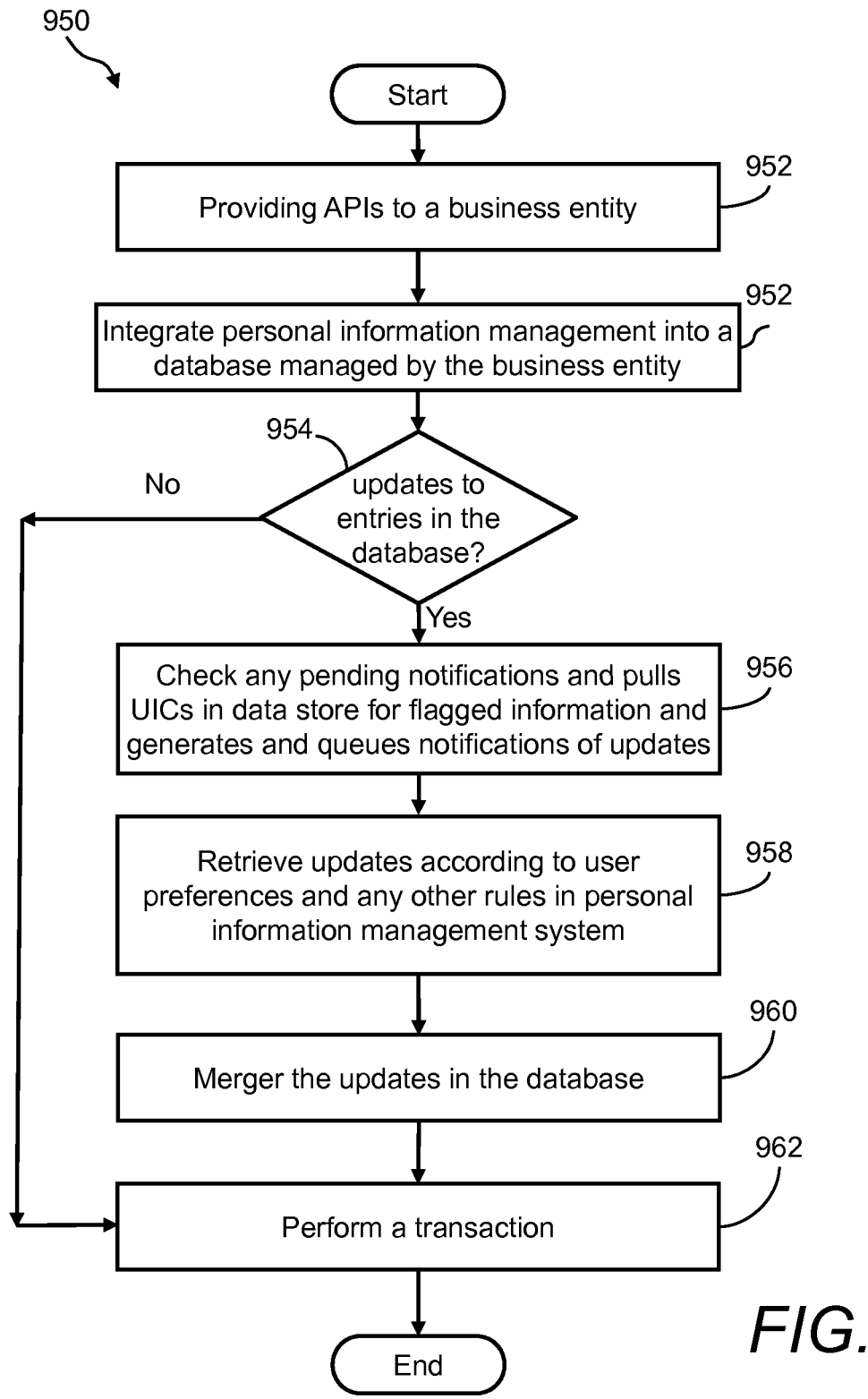
FIG. 9B shows a flowchart or process of a business entity relying on the personal information system of FIG. 1A to keep in touch with their customers.

FIG. 9B shows a flowchart or process 950 of a business entity relying on the personal information system to keep in touch with their customers. For example, an online retail store needs to make sure all information they have corrected so far for their customers are updated. The information may have been collected when the customers come to their website to sign up for an account. The information for a customer may include a name, a mail address, an email address, phone numbers and a credit card (which was entered for a transaction). In one embodiment, as described above, the information may have been classified into two categories, one is related to the contact data, and the other is related to sensitive information (e.g., the credit card).

When the customer needs to update any of the information, the customer has a choice what to release and who to release. For example, the customer shall be okay to release an update to the information in the first category to his contacts including some business entities so that he can stay in touch with his contacts or receive updated promotional/business information from the business entities. However, the customer may choose only those business entities that he has done business with to receive his updates to the sensitive information. With the updated sensitive information, the customer can proceed with respective transactions at selected stores without having to update the same one store at a time.

At 952, instead of running an application or module, a set of application program interfaces (APIs) is provided to a business entity. The business entity integrates the personal information management into a database by calling the APIs. Periodically or prior to contacting customers or users in the database, the business entity checks the database to see if there are any updates to the entries in the database at 954. As described above, after a user updates his personal information in any of the categories, a notification is created and maintained for the business entity to retrieve the update, where it is assumed that the business entity was selected by the user to receive the update.

It there is not update from any of the users in the database, the process 950 goes to 962 for the business entity to proceed with the use of the database. It is now assumed that there is at least one update from one of the users in the database, which can be detected by call the APIS to determine if there are any pending notifications. At 956, the APIs checks the notifications which were individually pushed by a server operating the personal management system (e.g., the server 110 of FIG. 1A). These notifications are examined locally (not in the server). At 958, the APIs are activated to create respective requests to retrieve the updates in accordance with the links in the notifications. Depending on implementations, some of the updates reside respectively in the devices being used by the users who have updated their personal information, others may be cached or reside in the server. At 960, these updates are retrieved from these devices and are now used to update the database. Those skilled in the art shall appreciate that the process at 958 does not imply that it happens at one time. Depending on implementation, the retrieval processing may happen periodically, repeatedly or at predefined times to ensure all the updates are obtained successfully. As a result, the database is up to date. At 962, the business entity can now proceed with the use of the database.

One of the advantages, benefits and objectives is to provide a mechanism for an entity (a user or an organization) to get updates from their contacts. In return, these contacts can control what to share and who to get the updates. Further the updates do not have to be uploaded to a repository and may be very well distributed where these updates were created.

The invention is preferably implemented in software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiment.

I claim:

1. A software product loaded in a nontransitory computer readable media and executed in a server computer to cause the server computer to perform operations of:
   creating a link between a first user and a second user when the first user uses a first device to initiate a relationship with the second user using a second device by sharing a portion or all of personal information of the first user with the second user, wherein the first user is a registered user of a personal information management system, the link is updated when the second user changes from a non-registered user to a registered user;
   allowing the second user to view the portion or all of personal information of the first user in a way depending on whether the second user is a non-registered user or a registered user;
   sending out a notification by the server computer to the second user in accordance with a preference setting by the second user when the first user has updated the personal information, wherein the preference setting is used by the server computer to control, not immediately, but when the notification shall be sent to the second user, the notification includes one or more links to data pertaining to the updated personal information, the links keep unchanged regardless how many times the personal information has been updated and are directed to the updated personal information, and allows the second user to retrieve the updated personal; and
   facilitating the second device to retrieve the updated personal information from the first device after the first user had updated some of the personal information on the first device and from the server computer after the first user had updated some of the personal information through the server computer.

2. The software product as recited in claim 1, wherein the links are collectively referenced to a container created for the first user but provide respective paths to the updated information distributed on the first device and the server computer, the container is designed to hold information pertaining to one category and includes data as to where content thereof is located.

3. The software product as recited in claim 2, wherein the link between the first user and the second user is created pertaining to which part of the personal information the first user has determined to share with the second user.

4. The software product as recited in claim 2, wherein each of the first and second devices is a mobile device.

5. The software product as recited in claim 4, wherein the notification is buffered in the server computer in accordance with the preference setting and sent out only in a form chosen by the second user.

6. The software product as recited in claim 5, wherein the personal information of the first user is encapsulated in the container designed to include metadata and a link to an external source.

7. The software product as recited in claim 2, wherein the second user is a business entity operating a database embedded with modules that, when activated, communicate with the server computer to retrieve the updated personal information from all customers including the first user and update the database by correlating all information the business entity has maintained for each of the customers.

8. The software product as recited in claim 7, wherein the updated personal information for the first user includes an updated payment arrangement, the database is updated with the updated personal information and the business entity uses the updated database to reach the customers while one of the customers can close a transaction with the business entity without manually updating his/her account with a new payment arrangement.

9. The software product as recited in claim 1, wherein the personal information includes a plurality of containers, each of the containers is designed to hold information pertaining to one category and includes data as to where content thereof is located.

10. The software product as recited in claim 9, wherein each of the containers includes data pertaining to multiple locations where the personal information and the updated personal information reside in distributed fashion.

11. A software product loaded in a nontransitory computer readable media and executed in a first portable computing device to cause the first portable computing device to perform operations of:
   providing a graphic interface to allow a first user to create personal information thereof and update the personal information on the first portable computing device;
   uploading the personal information to a server computer configured to operate a personal information management system;
   caching the updated personal information locally in the first portable computing device;
   releasing the updated personal information from the first portable computing device to a second portable computing device being used by a second user when the server computer authorizes a request from the second computing device, wherein the request is routed to the first portable computing device via the server computer, and the server is configured to update a notification originally created to notify the second user of the updated personal information, and wherein the server is configured to:

create a link between the first user and the second user when the first user initiates a relationship with the second user by sharing a portion or all of the personal information of the first user with the second user, the first user is a registered user of the personal information management system, the link is updated when the second user changes from a non-registered user to a registered user;

allow the second user to view the portion or all of personal information of the first user in a way depending on whether the second user is a non-registered user or a registered user; and send out the notification to the second user in accordance with a preference setting by the second user when the first user has updated the personal information, wherein the preference setting is used by the server computer to control when the notification shall be sent to the second user, after the first user has updated the personal information, wherein the notification includes one or more links remaining unchanged regardless how many times the personal information has been updated, and allowing the second user to retrieve the updated personal information from the first portable computing device after the first user had updated some of the personal information on the first portable computing device and from the server computer after the first user had updated some of the personal information through the server computer.

12. The software product as recited in claim 11, wherein the links are collectively referenced to a container created for the first user but provide respective paths to the updated information distributed on the first portable computing device and the server computer, the container is designed to hold information pertaining to one category and includes data as to where content thereof is located.

13. The software product as recited in claim 12, wherein the notification is buffered in the server computer in accordance with the preference setting and sent out only in a form chosen by the second user.

14. The software product as recited in claim 11, wherein the personal information of the first user is encapsulated in a container designed to include metadata and a link to an external source.

15. The software product as recited in claim 14, further causing the server computer to perform operations of: resetting the notification that the updated personal information has been retrieved.

16. The software product as recited in claim 15, wherein the updated personal information for the first user includes an updated payment arrangement, the database is updated with the updated personal information and the business entity uses the updated database to reach the customers while one of the customers can close a transaction with the business entity without manually updating his/her account with a new payment arrangement.

17. The software product as recited in claim 11, wherein the personal information includes a plurality of containers, each of the containers is designed to hold information pertaining to one category and includes data as to where content thereof is located.

18. The software product as recited in claim 17, wherein the each of the containers includes data pertaining to multiple locations where the personal information and the updated personal information reside in distributed fashion.

19. The software product as recited in claim 11, wherein the second user is a business entity operating a database embedded with modules that, when activated, communicate with the server computer to retrieve updated personal information from all customers including the first user and update the database by correlating all information the business entity has maintained for each of the customers.

* * * * *